April 28, 1931.  F. HITCHINER  1,802,424
EYEGLASSES
Filed Jan. 17, 1928
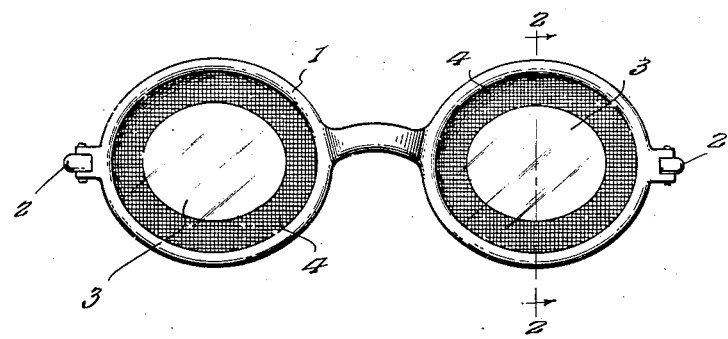
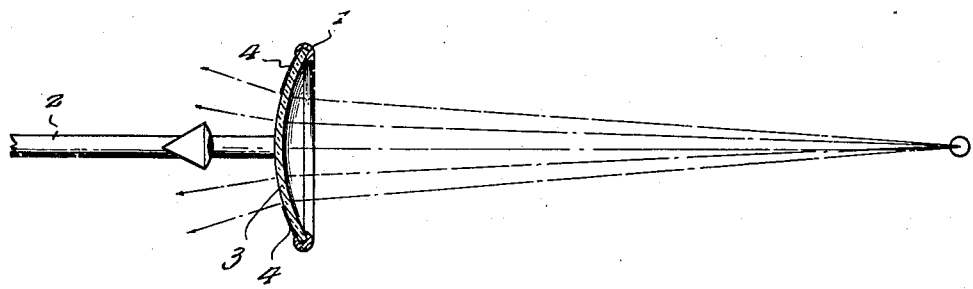
Inventor
Frank Hitchiner.
By Lacey & Lacey, Attorneys Patented Apr. 28, 1931

1,802,424

UNITED STATES PATENT OFFICE

FRANK HITCHINER, OF FALCONER, NEW YORK

EYEGLASSES

Application filed January 17, 1928. Serial No. 247,397.

This invention aims to prevent the blinding of the driver of a vehicle by the glaring headlights of approaching vehicles, and to offset the reflection due to the projection of rays of light through the rear window from the headlights of following vehicles.

The invention consists of eye-glasses of concavo convex form arranged so that the convex side is presented to the eyes, thereby diffusing the rays of light which are softened and modified so as not to interfere with the vision of the driver to the extent of making control of the vehicle unsafe.

The invention furthermore consists of eye glasses having the outer marginal portion opaque to prevent reflection from the rear due to rays of light being projected through the rear window from the headlights of following vehicles.

While the drawing illustrates a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawing hereto attached, in which,—

Figure 1 is a front view of eye glasses embodying the invention.

Figure 2 is a sectional view on the line 2—2 of Figure 1, looking in the direction indicated by the arrows, and illustrating the diffusion of light rays.

Corresponding and like parts are referred to in the following description and designated in the two views of the drawing by like reference characters.

The eye glasses shown are of the type comprising a frame 1 and temple bars 2 pivoted to lugs at opposite ends of the frame. The lenses 3 are concavo convex and are fitted to the frame so that the concave side faces forwardly and the convex side faces rearwardly so as to be presented to the eyes of the user. This arrangement of the lenses results in a diffusion of the rays of light projected against the front concave side, as indicated by the dotted lines in Figure 2 of the drawings. The light therefore, is softened and the blinding glare overcome, so that the driver may proceed with safety when encountering the light projected from the lamp of an approaching vehicle.

A marginal portion of the lenses 3 is rendered opaque, as indicated at 4, the purpose being to obviate interference with the vision of the driver by rays of light projected forwardly from following vehicles. The opacity 4 may be effected in any determinate way, usually by applying a coating to the rear or convex side of the lenses, as indicated most clearly in Figure 2 of the drawing.

Having thus described the invention, I claim:

Anti-glare eye glasses for vehicle drivers including a pair of transparent lenses of concavo-convex form arranged to present the concave side forwardly and the convex side rearwardly, each of the lenses having the outer marginal portion of the rear convex side opaque to prevent rays of light projected forwardly from the rear interfering with the vision of the driver.

In testimony whereof I affix my signature.

FRANK HITCHINER. [L. S.]